(12) United States Patent
Wang et al.

(10) Patent No.: US 10,151,834 B2
(45) Date of Patent: Dec. 11, 2018

(54) WEATHER DATA DE-CONFLICTING AND CORRECTION SYSTEM

(71) Applicant: Honeywell International Inc., Morris Plains, NJ (US)

(72) Inventors: Guoqing Wang, Beijing (CN); Ji Li, Beijing (CN); Haifeng Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 336 days.

(21) Appl. No.: 15/220,201

(22) Filed: Jul. 26, 2016

(65) Prior Publication Data

US 2018/0031698 A1     Feb. 1, 2018

(51) Int. Cl.
*G01S 13/95* (2006.01)
*G01S 7/00* (2006.01)
*G01S 13/87* (2006.01)

(52) U.S. Cl.
CPC ............ *G01S 13/953* (2013.01); *G01S 7/003* (2013.01); *G01S 13/87* (2013.01)

(58) Field of Classification Search
CPC ......... G01S 13/87; G01S 13/953; G01S 7/003
USPC .......................................................... 342/26
See application file for complete search history.

(56) References Cited

U.S. PATENT DOCUMENTS

| | | |
|---|---|---|
| 5,265,024 A | 11/1993 | Crabill et al. |
| 5,530,909 A | 6/1996 | Simon et al. |
| 5,657,009 A | 8/1997 | Gordon |
| 6,014,606 A | 1/2000 | Tu |
| 6,043,756 A | 3/2000 | Bateman et al. |
| 6,441,773 B1 | 8/2002 | Kelly et al. |
| 6,448,922 B1 | 9/2002 | Kelly |

(Continued)

FOREIGN PATENT DOCUMENTS

| | | |
|---|---|---|
| CN | 103512562 A | 1/2014 |
| EP | 2290636 A1 | 3/2011 |

(Continued)

OTHER PUBLICATIONS

"The Garmin Marine Network, The Ultimate in Onboard Navigation Solutions," Garmin International Inc., retrieved from http://www8.garmin.com/marine/brochures/06542_MRN_network_brochure_v2.pdf on Feb. 5, 2015, 20 pp.

(Continued)

*Primary Examiner* — Timothy A Brainard
(74) *Attorney, Agent, or Firm* — Shumaker & Sieffert, P.A.

(57) ABSTRACT

In one example, this disclosure is directed to a system configured to receive a first set of weather data from an onboard weather data system disposed on an aircraft. The system is configured to receive a second set of weather data from a remote weather data system separate from the aircraft, wherein the second set of weather data and the first set of weather data provide coverage at least in part of an overlapping volume of airspace and an overlapping time interval. The system is configured to determine whether a difference between the first set of weather data and the second set of weather data is above a nominal threshold of difference. The system is configured to generate a corrective output in response to determining that the difference between the first set of weather data and the second set of weather data is above the nominal threshold of difference

20 Claims, 7 Drawing Sheets

(56) References Cited

U.S. PATENT DOCUMENTS

| | | |
|---|---|---|
| 6,501,392 B2 | 12/2002 | Gremmert et al. |
| 6,536,272 B1 | 3/2003 | Houston et al. |
| 6,720,920 B2 | 4/2004 | Breed et al. |
| 6,721,559 B1 | 4/2004 | Kocin et al. |
| 6,828,922 B1 | 12/2004 | Gremmert et al. |
| 6,977,608 B1 | 12/2005 | Anderson et al. |
| 7,047,114 B1 | 5/2006 | Rogers |
| 7,069,147 B2 | 6/2006 | Manfred et al. |
| 7,084,775 B1 | 8/2006 | Smith |
| 7,302,493 B1 | 11/2007 | Alles et al. |
| 7,365,675 B2 | 4/2008 | Pearlman et al. |
| 7,406,382 B2 | 7/2008 | Brulle-Drews |
| 7,633,428 B1 | 12/2009 | McCusker et al. |
| 7,633,430 B1 | 12/2009 | Wichgers et al. |
| 7,817,078 B2 | 10/2010 | Bunch |
| 8,022,859 B2 | 9/2011 | Bunch et al. |
| 8,085,182 B2 | 12/2011 | Kauffman |
| 8,130,121 B2 | 3/2012 | Smith et al. |
| 8,180,507 B2 | 5/2012 | Dokken |
| 8,203,480 B1* | 6/2012 | Woodell .............. G01S 7/003 342/26 B |
| 8,217,828 B2 | 7/2012 | Kirk |
| 8,314,730 B1 | 11/2012 | Musiak et al. |
| 8,332,087 B2 | 12/2012 | Yannacone, Jr. et al. |
| 8,604,963 B1 | 12/2013 | Kronfeld et al. |
| 8,629,788 B1 | 1/2014 | Greenleaf et al. |
| 8,831,795 B2 | 9/2014 | Cabos |
| 9,223,020 B1 | 12/2015 | Crosmer et al. |
| 9,256,004 B2 | 2/2016 | Agarwal et al. |
| 9,535,158 B1 | 1/2017 | Breiholz et al. |
| 2004/0244476 A1 | 12/2004 | Andrews et al. |
| 2008/0035784 A1 | 2/2008 | Meserole et al. |
| 2008/0147257 A1 | 6/2008 | Kuhlgatz et al. |
| 2008/0255714 A1 | 10/2008 | Ross |
| 2010/0042275 A1 | 2/2010 | Kirk |
| 2010/0144912 A1 | 6/2010 | Kawasumi et al. |
| 2010/0245164 A1 | 9/2010 | Kauffman |
| 2010/0332056 A1 | 12/2010 | Kirk |
| 2011/0074624 A1* | 3/2011 | Bunch .............. G01S 7/003 342/26 D |
| 2011/0161833 A1 | 6/2011 | Dheap et al. |
| 2012/0239285 A1 | 9/2012 | Oster |
| 2013/0338920 A1 | 12/2013 | Pasken et al. |
| 2015/0074191 A1 | 3/2015 | Feng et al. |
| 2015/0304813 A1 | 10/2015 | Esposito et al. |
| 2016/0070010 A1 | 3/2016 | Calupca et al. |
| 2016/0182297 A1 | 6/2016 | Dauneria et al. |
| 2016/0182997 A1 | 6/2016 | Wilson |

FOREIGN PATENT DOCUMENTS

| | | |
|---|---|---|
| EP | 2575120 A2 | 4/2013 |
| WO | 00013047 A1 | 3/2000 |
| WO | 2011019111 A1 | 2/2011 |

OTHER PUBLICATIONS

"Voluntary Observations from Mariners," NOAA National Weather Service, retrieved from http://www.nws.noaa.gov/pm/marine/voluntary.htm on Feb. 5, 2015, 4 pp.

U.S. Appl. No. 14/687,799, filed by Esposito et al., on Apr. 15, 2015.

Chang et al., "Implementation of AIS-based Marine Meteorological Applications," Oceans 2014, IEEE, Apr. 7, 2014, 4 pp.

Extended European Search Report from counterpart European Patent Application No. 17180839.7, dated Nov. 22, 2017, 8 pp.

* cited by examiner

WEATHER DATA DE-CONFLICTING AND CORRECTION SYSTEM

BACKGROUND

An aircraft may use an onboard weather radar system to detect adverse weather conditions, which may enable the flight crew to make changes to the flight plan as necessary to avoid potentially hazardous weather. The onboard weather radar system may be mounted on the aircraft and may use radar scans to detect reflected radar signals from weather formations such as convective weather cells associated with turbulence, rain, lightning, and hail. Up-to-date weather information may assist the flight crew of the aircraft in evaluating whether or how to modify a flight plan to ensure safety of the flight, as well as to promote fuel efficiency, time efficiency, and passenger comfort. The onboard weather radar system may control weather radar scanning and may process radar return signals to present a visual weather radar display. An aircraft in flight may also receive weather data from other sources such as ground-based weather radar stations, which may help identify convective weather regions or other emerging hazards for aircraft operations. Aircraft operators and flight crews may thus be enabled to evaluate hazardous areas as they are detected and to evaluate potential changes in heading or flight altitude in response.

SUMMARY

This disclosure is directed to techniques, systems, devices, and methods for a system for receiving weather radar data from an aircraft onboard radar system and from a weather data uplink service, comparing the onboard weather radar data with the uplink weather data, and verifying that the data is mutually consistent or de-conflicting the data if it is not mutually consistent above a threshold of significance. If the system finds the data conflicted and de-conflicts the data, the system generates a corrective output based on its de-conflicting of the data. The corrective output may be one of the data sets deemed more reliable or more likely accurate, which may be the onboard weather radar data, along with an indication that that set of data was deemed more accurate. The corrective output may also be a weighted average or combination of the conflicted data sets, such as in cases where the accuracy of the conflicted data sets is deemed comparable.

The onboard weather data de-conflicting system may communicate the corrective output to the weather data uplink service, which may include or be a weather data aggregating system. The onboard weather data de-conflicting system may thus provide its relevant data to a weather data aggregating system when needed to correct the weather data available to and provided by the weather data aggregating system, with reduced transmission frequency and lower cost relative to an onboard weather radar system that transmits or downlinks updated data to a weather data aggregating system on a regular basis. The weather data aggregating system may incorporate the corrective output into its weather data for use for uplinking or communicating to other consumers, subscribers, or other users of its weather data. In various examples, a de-conflicting process may be performed by an airborne system onboard an aircraft that detects conflicts between data sets, performs de-conflicting, and generates a corrective output. In some examples, an onboard de-conflicting system may detect a data conflict, and then downlink a corrective output only in the form of the conflicted data or an indication of the conflicted data, for a ground-based or other remote system (e.g., a weather data aggregating system) to perform further de-conflicting analysis. In various other examples, a system of this disclosure may be implemented in a weather data aggregating system, weather data uplink service, or ground-based system.

This disclosure thus involves concepts of a received wide range strategic weather information distributed by a weather data service provider which is conveniently accessible to one or more participating aircraft. The onboard systems of a participating aircraft equipped with a weather data de-conflicting system of this disclosure may process and compare potentially higher quality aircraft meteorological sensor data, including aircraft weather radar data, with weather data uplinked from the weather data service provider. The onboard systems of a participating aircraft equipped with a weather data de-conflicting system of this disclosure may then downlink the sensed weather data from the aircraft weather radar system and potentially other aircraft weather data systems to the weather data service provider when deviations in the compared weather data exceed certain thresholds. The ground-based weather data service provider and its database may thus be augmented with the participating aircraft downlink in a communication cost efficient way.

One example is directed to a system comprising one or more processors configured to receive a first set of weather data from an onboard weather data system disposed on an aircraft. The one or more processors are further configured to receive a second set of weather data from a remote weather data system separate from the aircraft, wherein the second set of weather data and the first set of weather data provide coverage at least in part of an overlapping volume of airspace and an overlapping time interval. The one or more processors are further configured to determine whether a difference between the first set of weather data and the second set of weather data is above a nominal threshold of difference. The one or more processors are further configured to generate a corrective output in response to determining that the difference between the first set of weather data and the second set of weather data is above the nominal threshold of difference.

Another example is directed to a method comprising receiving, with one or more processors, a first set of weather data from an onboard weather data system disposed on an aircraft. The method further comprises receiving, with the one or more processors, a second set of weather data from a remote weather data system separate from the aircraft, wherein the second set of weather data and the first set of weather data provide coverage at least in part of an overlapping volume of airspace and an overlapping time interval. The method further comprises determining, with the one or more processors, whether a difference between the first set of weather data and the second set of weather data is above a nominal threshold of difference. The method further comprises generating, with the one or more processors, a corrective output in response to determining that the difference between the first set of weather data and the second set of weather data is above the nominal threshold of difference.

Another example is directed to a device comprising one or more processors and a computer-readable storage medium operatively coupled to the one or more processors and comprising executable instructions. The executable instructions configure the one or more processors to receive a first set of weather data from an onboard weather data system disposed on an aircraft. The executable instructions further configure the one or more processors to receive a second set of weather data from a remote weather data system separate from the aircraft, wherein the second set of weather data and the first set of weather data provide coverage at least in part of an overlapping volume of airspace and an overlapping time interval. The executable instructions further configure the one or more processors to determine whether a difference between the first set of weather data and the second set of weather data is above a nominal threshold of difference. The executable instructions further configure the one or more processors to generate a corrective output in response to determining that the difference between the first set of weather data and the second set of weather data is above the nominal threshold of difference.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Weather data de-conflicting techniques, systems, devices, and methods of this disclosure may enable verifying and de-conflicting conflicting sets of weather data from different sources. Various examples of weather data de-conflicting techniques, systems, devices, and methods are further described below.

Figure 1:
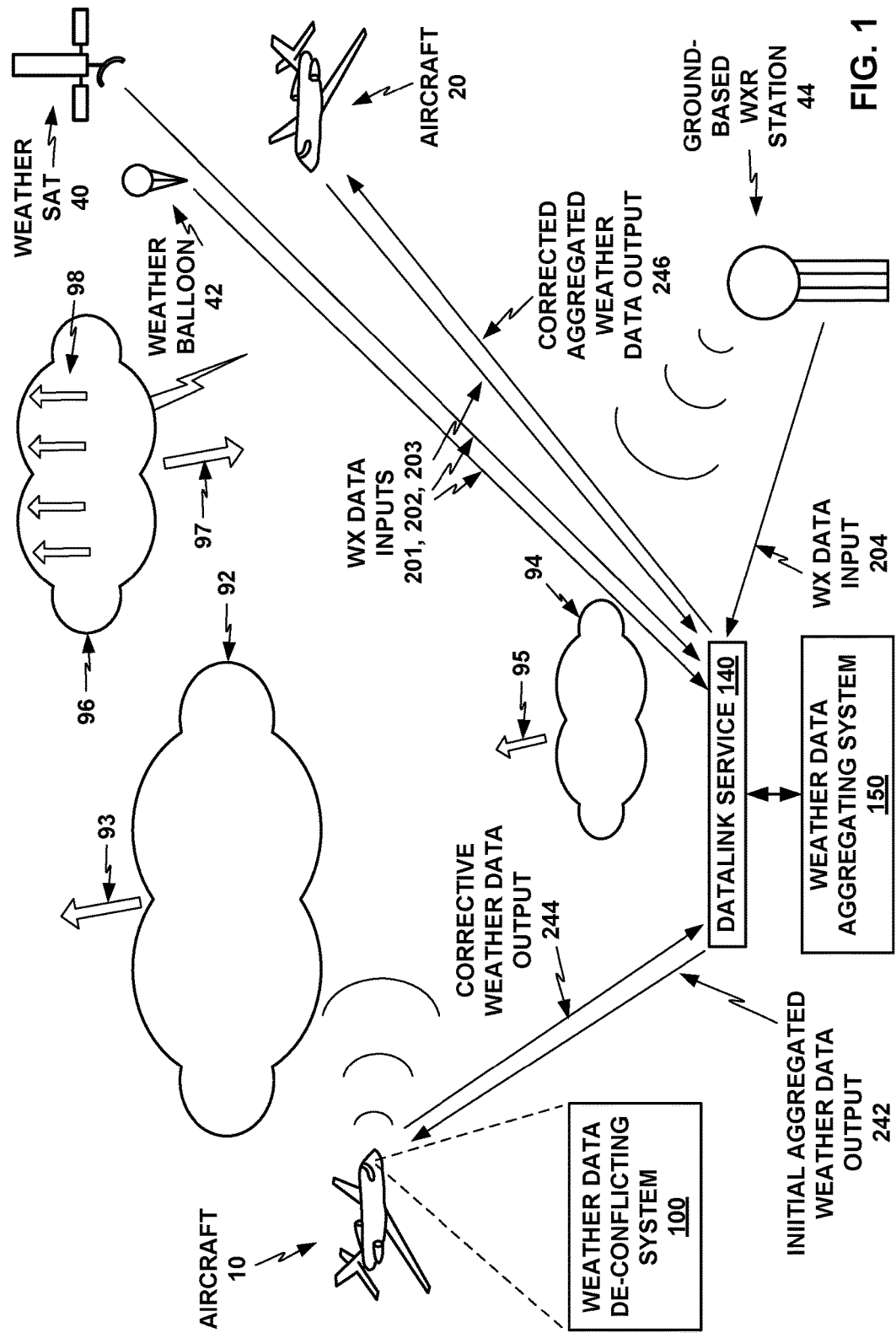
FIG. 1 depicts a conceptual diagram of an aircraft equipped with an example weather data de-conflicting system configured to compare and de-conflict weather data from an onboard weather radar system on aircraft and a weather data uplink service from a weather data aggregating system, in accordance with one example of the disclosure.

FIG. 1 depicts a conceptual diagram of an aircraft 10 equipped with an example weather data de-conflicting system 100 configured to compare and de-conflict weather data from an onboard weather radar system on aircraft 10 and a weather data uplink service from a weather data aggregating system 150, in accordance with one example of the disclosure. In this example, aircraft 10 includes an onboard weather radar system that performs and processes weather radar scans. Aircraft 10 also includes a datalink system that communicates with weather data aggregating system 150 in more or less regular, intermittent communication other via datalink service 140. Aircraft 10 thereby also receives uplinked weather data from weather data aggregating system 150. Weather data de-conflicting system 100 onboard aircraft 10 may then compare and verify or de-conflict the onboard weather radar data and the uplinked weather data for the same or otherwise overlapping time and volume of space.

In cases where weather data de-conflicting system 100 determines that the different weather data sets are conflicted, weather data de-conflicting system 100 may then perform a de-conflicting analysis and generate a corrective output, which weather data de-conflicting system 100 may communicate back to weather data aggregating system 150 via datalink service 140. Weather data aggregating system 150 may then incorporate the corrective output in subsequent aggregated weather data it provides to its users.

Datalink service 140 may include and/or make use of one or more ground-based datalink assets, one or more telecommunication satellites, and potentially additional assets, as further described below with reference to FIG. 2. Weather data aggregating system 150 may use datalink service 140 to gather weather data from various weather data collecting assets, such as various aircraft, including aircraft 10 and representative additional aircraft 20; various weather satellites, including representative weather satellite 40, various weather balloons including representative weather balloon 42, various ground-based weather radar stations including representative ground-based weather radar station 44, weather data collecting drones or uncrewed aerial vehicles (UAVs) (not shown in FIG. 1), marine-based weather radar systems installed or carried on marine vessels, oil platforms, or other marine assets (not shown in FIG. 1), and/or any of a wide variety of other assets that may collect any type of data relevant to weather. Weather satellite 40 may scan weather formations in microwave, infrared, or other wavelength from Earth orbit, for example. Ground-based weather radar station 44 may be part of a network of ground-based weather radar systems such as the Next Generation Weather Radar System (NexRad) radar network operated by the National Weather Service in the United States, for example.

Weather data aggregating system 150 may be ground-based, e.g., at a centralized weather information service provider, or at an airline company operations center, in some examples. Weather data aggregating system 150 may aggregate weather data from a large number and variety of different weather data sources, including potentially intermediate weather data service providers that may themselves aggregate weather data from various sources. For example, weather data aggregating system 150 may aggregate weather data directly from the sources and/or from intermediate weather data aggregating services that may provide weather data from NEXRAD, satellite cloud height data, wind aloft data, temperatures aloft data, echo top and storm movement data, AIRMET data, SIGMET data, lightning data, CONUS radar coverage mask data, Clear Air Turbulence (CAT) data, and Storm Cell Info Tracking (SCIT) data, for example.

The various weather data gathering assets may transmit weather data they collect, such as representative weather data communications 201, 202, 203, 204 from weather balloon 42, weather satellite 40, aircraft 20 (collectively, "weather data gathering assets 20-44," representative of any number and variety of weather data gathering assets, but not including aircraft 10 for purposes of this discussion), and ground-based weather radar station 44, to weather data aggregating system 150 via datalink service 140. Weather data gathering assets 20-44 as shown in FIG. 1 are representative examples of weather data collecting systems, which may also include any number of aircraft, other air-based weather radar and/or weather sensing platforms, ground-based weather radar and/or weather sensing systems, sea-based weather radar and/or weather sensing platforms, satellites or other space-based weather radar and/or weather sensing platforms, and various other vehicles, platforms, or assets equipped with weather radar and/or weather sensing systems. Weather data aggregating system 150 may aggregate and integrate the weather data it receives from the various weather data sources such as weather data gathering assets 20-44, and transmit portions of the aggregated weather data to subscribers, users, or other recipients, as further described below.

Aircraft 10 (via its onboard weather radar system) and the other weather data gathering assets 20-44 may each, via weather radar or other weather data collecting means, characterize the weather of at least partially overlapping portions of a volume of space of the sky during an at least partially overlapping time interval, as conceptually depicted in FIG. 1. For example, aircraft 20, weather balloon 42, and ground-based weather radar station 44 may be operating proximate to (e.g., within tens or hundreds of miles of) aircraft 10, and weather satellite 40 may be operating from an orbital position above the airspace of aircraft 10. The weather in this volume of space during this interval of time depicted in FIG. 1 includes convective weather cells 92,94, and 96 ("convective weather cells 92-96"). Aircraft 10 is equipped with onboard weather radar system 12, and may operate weather radar system 12 to collect radar data characterizing the weather proximate to and along the heading of aircraft 10.

Aircraft 10 and the other weather data gathering assets 20-44 may all gather data on convective weather cells 92-96 and transmit the data on convective weather cells 92-96 to weather data aggregating system 150. Convective weather cells 92,94, and 96 have lateral motions 93,95,97 (represented in FIG. 1 with arrows 93, 95, 97) respectively, and weather cell 96 has a vertical growth trend 98 (represented in FIG. 1 with arrows 98). Aircraft 10 and at least some of the other weather data gathering assets 20-44 may characterize the lateral motions and vertical trends of convective weather cells 92-96 and include the characterizations of the lateral motions and vertical trends of convective weather cells 92-96 in their weather data.

Aircraft 10 may be substantially closer to convective weather cell 92 than any other aircraft or other weather data gathering asset during the time interval of FIG. 1, and may be in position such that its onboard weather radar system is able to characterize convective weather cell 92 with higher resolution than any other weather data gathering asset during the depicted interval of time. Convective weather cell 92 may also be at least partly obscured from the perspective of at least some of weather data gathering assets 20-44 by other weather features such as convective weather cells 94 and 96, which may be highly radar-reflective, such as due to high levels of internal precipitation, such that convective weather cells 94 and 96 may strongly reflect active weather radar scanning signals from of at least some of weather data gathering assets 20-44, and may saturate the gain of weather radar receivers of weather radar systems of at least some of weather data gathering assets 20-44, in this example. Intervening weather features such as convective weather cells 94 and 96 may thus degrade or obscure weather radar signals or other weather data signals of the region that includes convective weather cell 92 from at least some of weather data gathering assets 20-44 in this example.

Aircraft 10 has an onboard graphical weather radar display system (not shown in FIG. 1; shown in subsequent figures and further described below with reference thereto) that displays weather features based on the radar signals of the onboard weather radar system, and that displays graphical representations of convective weather cells 92-96. Onboard weather radar system 12 may detect the motions of convective weather cells 92, 94 over time, and output an indication of the motions of the convective weather cells 92, 94 in the onboard graphical weather radar display. For example, onboard weather radar system 12 may detect the horizontal motions of convective weather cells 92, 94 over time, such as in terms of radial horizontal motions (toward and away from aircraft 10) and tangential horizontal motions (side-to-side from the perspective of aircraft 10), which onboard weather radar system 12 may also detect in terms of or translate into north-south and east-west components of horizontal motion. Onboard weather radar system 12 may also detect reflectivity trends in convective weather cells 92, 94 over time, which may be indicative of whether convective weather cells 92, 94 are dissipating or growing larger and stronger.

Aircraft 10 also receives aggregated weather data from weather data aggregating system 150. Aircraft 10 is equipped with weather data de-conflicting system 100, which compares and verifies or de-conflicts data from the onboard weather radar system and weather data aggregating system 150, as further described below. FIG. 1 shows the communications between the various aircraft and systems in simplified conceptual form. FIG. 1 conceptually shows representative weather data communications 201, 202, 203, 204 from weather data gathering assets 20-44 to weather data aggregating system 150, and an initial aggregated weather data output 242 that weather data aggregating system 150 generates based on weather data communications 201, 202, 203, 204 and uplinks to various recipients including aircraft 10, via datalink service 140. FIG. 1 further shows a corrective weather data output 244 generated by weather data de-conflicting system 100 onboard aircraft 10, and downlinked from aircraft 10 to weather data aggregating system 150.

Weather data de-conflicting system 100 may transmit corrective weather data output 244 to weather data aggregating system 150 only when weather data de-conflicting system 100 detects a sufficiently significant conflict in weather data and determines a corrective output that it is able to provide. The corrective output may include at least any one or more of a portion of the first set of weather data corresponding to the overlapping volume of airspace and the overlapping time interval, some other corrective data set corresponding to the overlapping volume of airspace and the overlapping time interval, an indication of the difference between the first set of weather data and the second set of weather data, and/or an alert indicative of the determining that the difference between the first set of weather data and the second set of weather data is above the nominal threshold of difference, in various examples.

Weather data de-conflicting system 100 may be configured such that determining the difference between the first set of weather data and the second set of weather data may include determining a difference between the first set of weather data and the second set of weather data in one or more of a horizontal motion of one or more weather features, a vertical trend of one or more weather features, and a reflectivity trend of one or more weather features. At least one of the first set of weather data and the second set of weather data may comprise data indicative of one or more of a lateral motion of a weather feature, a tangential motion of one or more weather features in the identified region, a radial motion of the one or more weather features in the identified region, a vertical trend of a weather feature, a reflectivity trend of a weather feature, lightning, ice, hail, wind shear, and clear air turbulence (CAT).

Weather data de-conflicting system 100 may also be configured to initiate a review of accuracy of other sets of weather data in response to determining that the difference between the first set of weather data and the second set of weather data is above the nominal threshold of difference, wherein the overlapping volume of airspace is a first overlapping volume of airspace and the overlapping time interval is a first overlapping time interval. Weather data de-conflicting system 100 may be configured such that the review of accuracy is directed to a second overlapping volume of airspace overlapping or proximate to the first overlapping volume of airspace and a second overlapping time interval overlapping or proximate to the first overlapping time interval.

Onboard weather data de-conflicting system 100 may thus provide its more relevant or valuable data to weather data aggregating system 150 when needed to correct the weather data available to and provided by weather data aggregating system 150, and avoid transmitting weather data to weather data aggregating system 150 that would be more or less redundant with or not contribute significantly to the weather data already available to and disseminated by weather data aggregating system 150. Onboard weather data de-conflicting system 100 may thus transmit weather data to weather data aggregating system 150 with reduced transmission frequency and reduced cost relative to an onboard weather radar system that did not perform de-conflicting and that transmitted updated data to weather data aggregating system 150 on a regular basis.

FIG. 1 further shows a corrected aggregated weather data output 246 that weather data aggregating system 150 generates based on the corrective weather data output 244 that weather data aggregating system 150 receives from weather data de-conflicting system 100, and that weather data aggregating system 150 subsequently uplinks to its recipients, such as aircraft 20. Weather data aggregating system 150 may thus provide its recipients with updated weather data with improved accuracy based on de-conflicted and corrective weather data outputs from weather data de-conflicting system 100. Weather data aggregating system 150 may combine the advantages of weather data coverage from a variety of weather data sources with a confirmed superior accuracy of one or more of those weather data sources due to implementation therein of a weather data de-conflicting system, such as onboard weather data de-conflicting system 100 of aircraft 10.

The data communications shown in FIG. 1 are simplified to show only one corrective weather data output 244 from only one implementation of a weather data de-conflicting system of this disclosure, weather data de-conflicting system 100 onboard aircraft 10, and to show only one corrected aggregated weather data output 246 from weather data aggregating system 150 to aircraft 20. In other examples, other aircraft or other weather data gathering assets may also generate and downlink corrective weather data outputs to weather data aggregating system 150 based on results of their own implementations of a weather data de-conflicting system of this disclosure, and weather data aggregating system 150 may generate corrected aggregated weather data outputs incorporating de-conflicted or corrected weather data from multiple weather data de-conflicting systems and uplinked to multiple recipients, also including aircraft 10.

Figure 2:
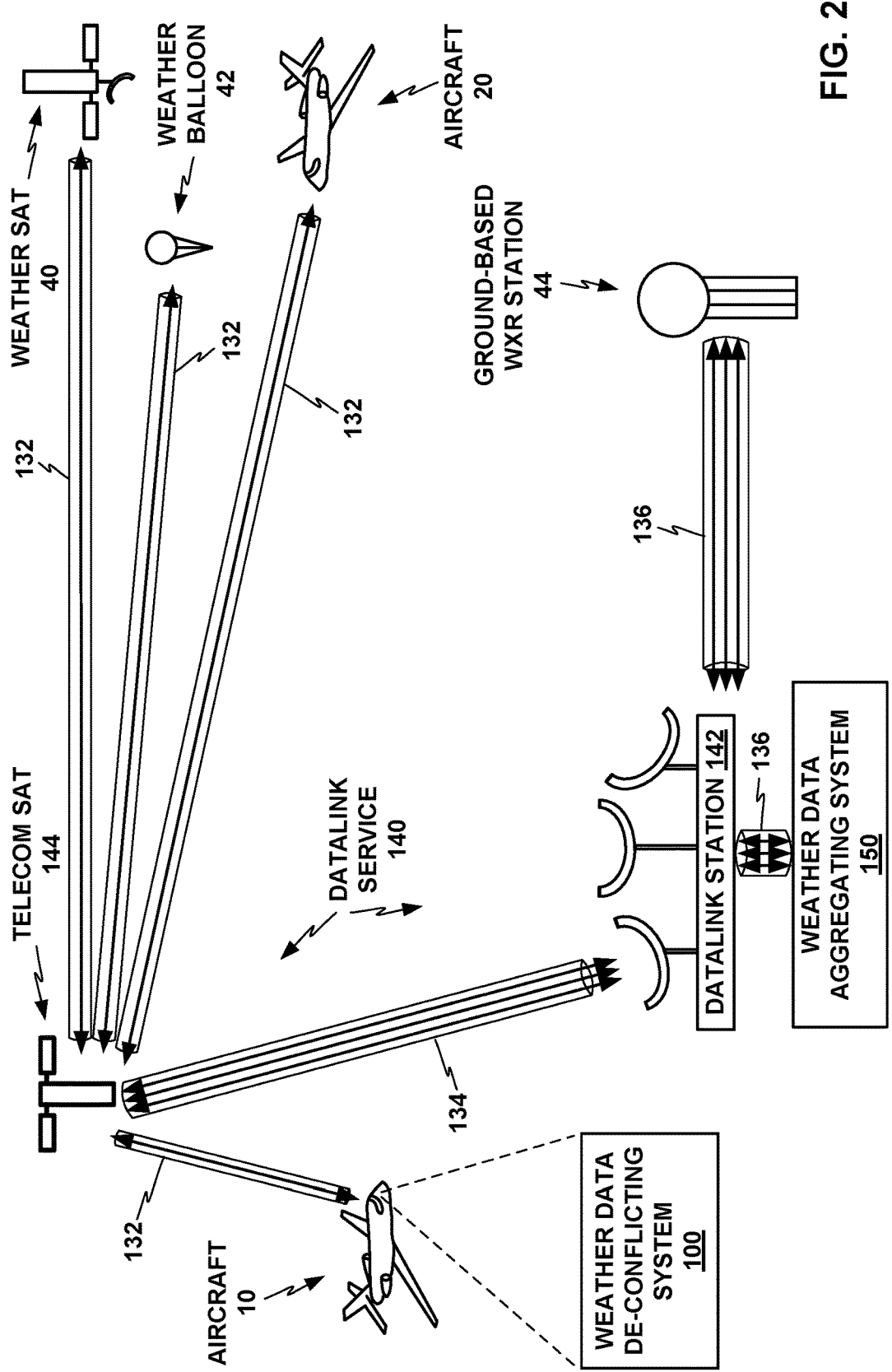
FIG. 2 depicts a conceptual diagram of an aircraft equipped with an example weather data de-conflicting system in communicative connection via a datalink service with a weather data aggregating system configured to aggregate weather data from multiple sources and provide aggregated weather data and to receive and disseminate de-conflicted weather data from the weather data de-conflicting system via the datalink service, in accordance with one example of the disclosure.

FIG. 2 depicts a conceptual diagram of an aircraft 10 equipped with an example weather data de-conflicting system 100 in communicative connection via datalink service 140 with weather data aggregating system 150 configured to aggregate weather data from multiple sources and provide aggregated weather data and to receive and disseminate de-conflicted weather data from the weather data de-conflicting system via datalink service 140, in accordance with one example of the disclosure. FIG. 2 provides additional detail, including of datalink service 140, of some examples corresponding to FIG. 1.

In the example of FIG. 2, datalink service 140 includes one or more datalink stations such as representative datalink station 142 and one or more telecommunications satellites such as representative telecommunications satellite 144. FIG. 2 also shows aircraft 20, weather satellite 40, weather balloon 42, and ground-based weather radar station 44 as in FIG. 1. Telecommunications satellite 144 are configured to maintain radio broadband datalink connections 132 with aircraft 10 and 20, weather satellite 40, and weather balloon 42. Telecommunications satellite 144 and datalink station 142 are configured to maintain a radio broadband datalink connection 134 with each other.

Datalink station 142 is also configured to maintain hardline broadband network connections 136 with ground-based weather radar station 44 and with weather data aggregating system 150. Datalink station 142 may also communicate directly with aircraft 10 using point-to-point data communication protocol. Datalink service 140 may also include ground-based datalink stations that communicate directly with aircraft 10, such as stations that implement Flight Information Services-Broadcast (FIS-B). Assets such as datalink station 142 and telecommunications satellite 144 may thus implement datalink service 140 to maintain broadband datalink connections among aircraft 10 and 20, weather data aggregating system 150, and other weather data collecting assets and aggregated weather data recipients.

Telecommunications satellite 144 may be equipped with broadband capability, such as Ka band datalink transmission and reception capability, in some examples. In one example, telecommunications satellite 144 may be a Global Xpress (GX) satellite operated by Inmarsat PLC. Telecommunications satellite 144 may be in geosynchronous Earth orbit (GEO) and may provide coverage over a large area of the Earth in some examples, and may interoperate with additional comparable telecommunications satellites that may provide complementary coverage over other large sections of the Earth, in some examples. Datalink service 140 may also be configured to include or operate with other types of remote coverage broadband datalink systems such as broadband datalink connections implemented by drones or automated airships, for example.

Aircraft 10 and 20, ground-based weather radar station 44, weather satellite 40, weather balloon 42, and other weather data collecting systems are thus enabled to communicate weather data to weather data aggregating system 150. Aircraft 10 and the onboard weather radar systems thereof and onboard weather data de-conflicting system 100 are enabled to receive aggregated weather data uplinked from weather data aggregating system 150 and to downlink corrective weather data to weather data aggregating system 150. In other examples, onboard weather data de-conflicting system 100 and weather data aggregating system 150 may use any other implementation of data connection to communicate data with each other.

Figure 3:
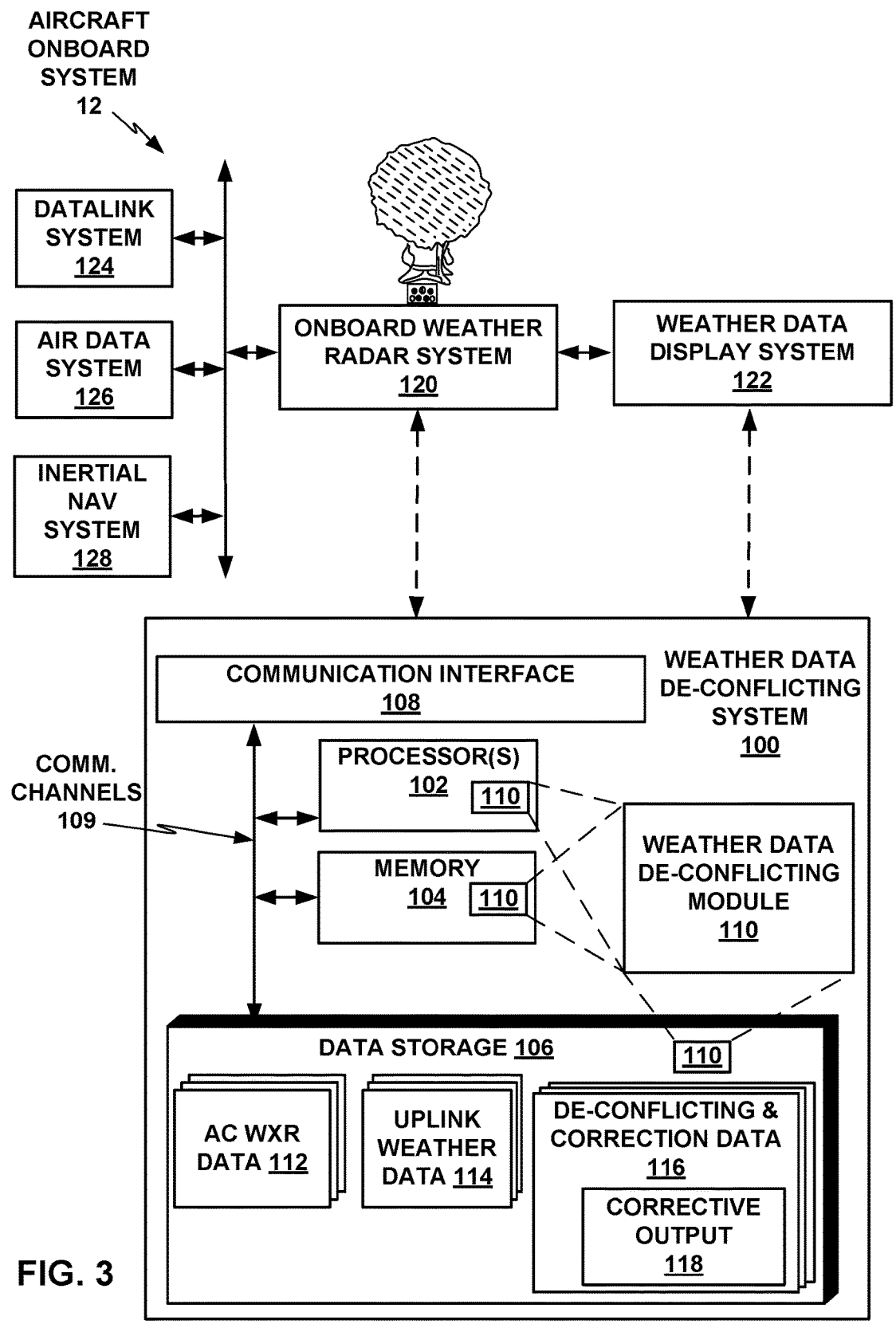
FIG. 3 depicts a conceptual block diagram of an aircraft onboard system including an onboard weather radar system, an onboard electronic weather radar display system, and a weather data de-conflicting system, in accordance with one example of the disclosure.

FIG. 3 depicts a conceptual block diagram of an aircraft onboard system 12 including an onboard weather radar system 120, an onboard electronic weather data display system 122, and a weather data de-conflicting system 100, in accordance with one example of the disclosure. Weather data display system 122 may include or be a weather radar display system configured to render display of weather radar data from onboard weather radar system 120. Weather data display system 122 may also be configured to display other weather data from other weather data sensors or sources. Portions or all of aircraft onboard system 12 may be implemented in an integrated avionics system.

While weather data de-conflicting system 100 is depicted separately from onboard weather radar system 120 and onboard electronic weather data display system 122 in FIG. 3, weather data de-conflicting system 100 may be part of or integrated with either or both of onboard weather radar system 120 or onboard electronic weather data display system 122 in various implementations. For example, in some implementations in which aircraft onboard system 12 is in an integrated architecture, weather data de-conflicting system 100 may be implemented as a modular avionics unit configured to collect data from all available components of onboard system 12. In some examples in which aircraft onboard system 12 is implemented in an integrated architecture or a federated architecture, weather data de-conflicting system 100 may be implemented as part of or co-located with weather data display system 122, which may already be configured to collect, process, and integrate data from several or all available weather data systems and sensors onboard aircraft 10. In other examples in which aircraft onboard system 12 is implemented in a federated architecture, onboard weather radar system 120 is a three-dimensional (3D) weather radar system, and weather data display system 122 does not have access to the full 3D scanning buffer memory of onboard weather radar system 120, weather data de-conflicting system 100 may be implemented as part of or co-located with onboard weather radar system 120, to facilitate weather data de-conflicting system 100 being configured to have access to the full 3D scanning buffer memory of onboard weather radar system 120.

Onboard weather radar system 120 is also operatively coupled to datalink system 124, which may include radio transmission and reception equipment (e.g., a Ka band radio interface) configured to maintain broadband datalink communications with datalink service 140 as shown in FIGS. 1 and 2. Datalink system 124 may thus also enable datalink communications between weather data de-conflicting system 100 and weather data aggregating system 150 as shown in FIGS. 1 and 2. Weather data de-conflicting system 100 as shown in FIG. 3 may be a more detailed view of the same weather data de-conflicting system 100 as shown in FIGS. 1 and 2.

FIG. 3 also shows an onboard air data system 126 and an onboard inertial navigation system 128 communicatively coupled to onboard weather radar system 120 as representative weather data systems in addition to onboard weather radar system 120. In various examples, air data system 126 may provide static air temperature / total air temperature (SAT/TAT), wind speed and directions, lightening sensor measures static discharges and its relative position, weather radar system scans of reflectivity, and processing and interpretation of various weather information. In various examples, inertial navigation system 128 may sense body acceleration and angular rate of aircraft 10 and thus indicate the presence and severity of turbulence, which may also be evaluated as part of the overall weather data gathered by aircraft onboard system 12.

Aircraft onboard system 12 may also include other instruments that may collect weather data or data relevant to evaluating the weather, such as an icing detection system (not shown) configured to indicate icing conditions, and/or a ground proximity warning system (GPWS) (not shown) that may host algorithms for recognizing wind shear, for example. Weather data display system 122 may process, integrate, and display weather data from any one or more of or a combination of the various components of aircraft onboard system 12 including onboard weather radar system 120, air data system 126, and inertial navigation system 128, and from datalink service 140, e.g., from weather data aggregating system 150. Weather data de-conflicting system 100 may evaluate any or all weather data from aircraft systems including onboard weather radar system 120, air data system 126, and inertial navigation system 128. Weather data de-conflicting system 100 may compare any or all weather data from aircraft systems including onboard weather radar system 120, air data system 126, and inertial navigation system 128 with weather data from datalink service 140, e.g., from weather data aggregating system 150.

As shown in FIG. 3, weather data de-conflicting system 100 includes one or more processors 102 ("processors 102") (e.g., CPUs), one or more memory components 104 ("memory 104") (which may host in-memory data stores), one or more data storage devices 106 ("data storage 106") (e.g., hard disc drives or flash drives, which may host databases or schemaless data stores), and a communication interface (CI) 108 (e.g., including a network or bus connection), which is connected to one or more of the other components depicted in FIG. 3 and via datalink system 124 to datalink service 140. Weather data de-conflicting system 100 is thus configured to communicate via datalink service 140.

In weather data de-conflicting system 100, the processors 102, memory 104, data storage 106, and communication interface 108 are interconnected by communication channels 109, such as a bus or communication fabric, for transporting or communicating data and instruction code between processors 102, memory 104, data storage 106, and communication interface 108. Processors 102 may include one or more central processing units (CPUs), one or more CPU cores, one or more graphical processing units (GPUs), or any other type of processing units. Memory 104 may include any form of working memory, such as any form of random access memory (RAM). Data storage 106 may include any form of hard disc drives, redundant array of independent discs (RAID), Flash drives, cloud storage, or any other form of data storage, and may host any form of databases, schemaless data stores, or any type of data stores. Weather data de-conflicting system 100 may process incoming data and outgoing data via communication interface 108, which may include interface subsystems for managing data communication with other systems and components of aircraft onboard system 12 including onboard weather radar system 120 and onboard electronic weather data display system 122, and via datalink system 124 with datalink service 140 and weather data aggregating system 150.

Weather data de-conflicting system 100 may receive weather radar data from onboard weather radar system 120 and may receive uplinked aggregated weather data from weather data aggregating system 150 via datalink service 140 and onboard datalink system 124. The weather radar data from onboard weather radar system 120 and the uplinked aggregated weather data from weather data aggregating system 150 may at least partially cover the same or otherwise overlapping volumes of space and the same or otherwise overlapping times. Weather data de-conflicting system 100 may at least temporarily store sets of aircraft weather radar data 112 from onboard weather radar system 120 and uplink weather data 114 from weather data aggregating system 150.

Weather data de-conflicting system 100 has a weather data de-conflicting module 110 installed thereon. Weather data de-conflicting module 110 may include or be a software application or software library stored in data storage 106, loaded in memory 104, and/or executed by processors 102. Weather data de-conflicting module 110 may include or be any form of executable software instruction code, including a stand-alone application, one or more portions of an executable software application, a software library or collection of applications, processes, and/or microservices, a library of multiple executable software applications and associated classes, methods, processes, functions, routines, or other resources, or other any other form of executable software instruction code. Weather data de-conflicting module 110 may also include or be implemented as specialized hardware such as one or more application-specific integrated circuits (ASICs), one or more field programmable gate arrays (FPGAs), and/or one or more graphical processing units (GPUs).

Weather data de-conflicting module 110 may configure processors 102 (or other processing hardware elements) to receive sets of weather data from multiple sources, such as aircraft weather radar data sets 112 from onboard weather radar system 120 and uplink weather data sets 114 from weather data aggregating system 150. Weather data de-conflicting module 110 may further configure processors 102 (or other processing hardware elements) to perform comparison, verification, and/or de-conflicting of sets of weather radar data and/or other weather data from multiple sources. Weather data de-conflicting module 110 may further configure processors 102 (or other processing hardware elements) to generate de-conflicting and correction data 116, including corrective weather data outputs, based on processes of comparing, de-conflicting, and/or correcting weather data sets from two or more weather data sources such as onboard weather radar system 120 and weather data aggregating system 150. These and other functions and capabilities for which weather data de-conflicting module 110 may configure processors 102 are further described below.

Figure 4:
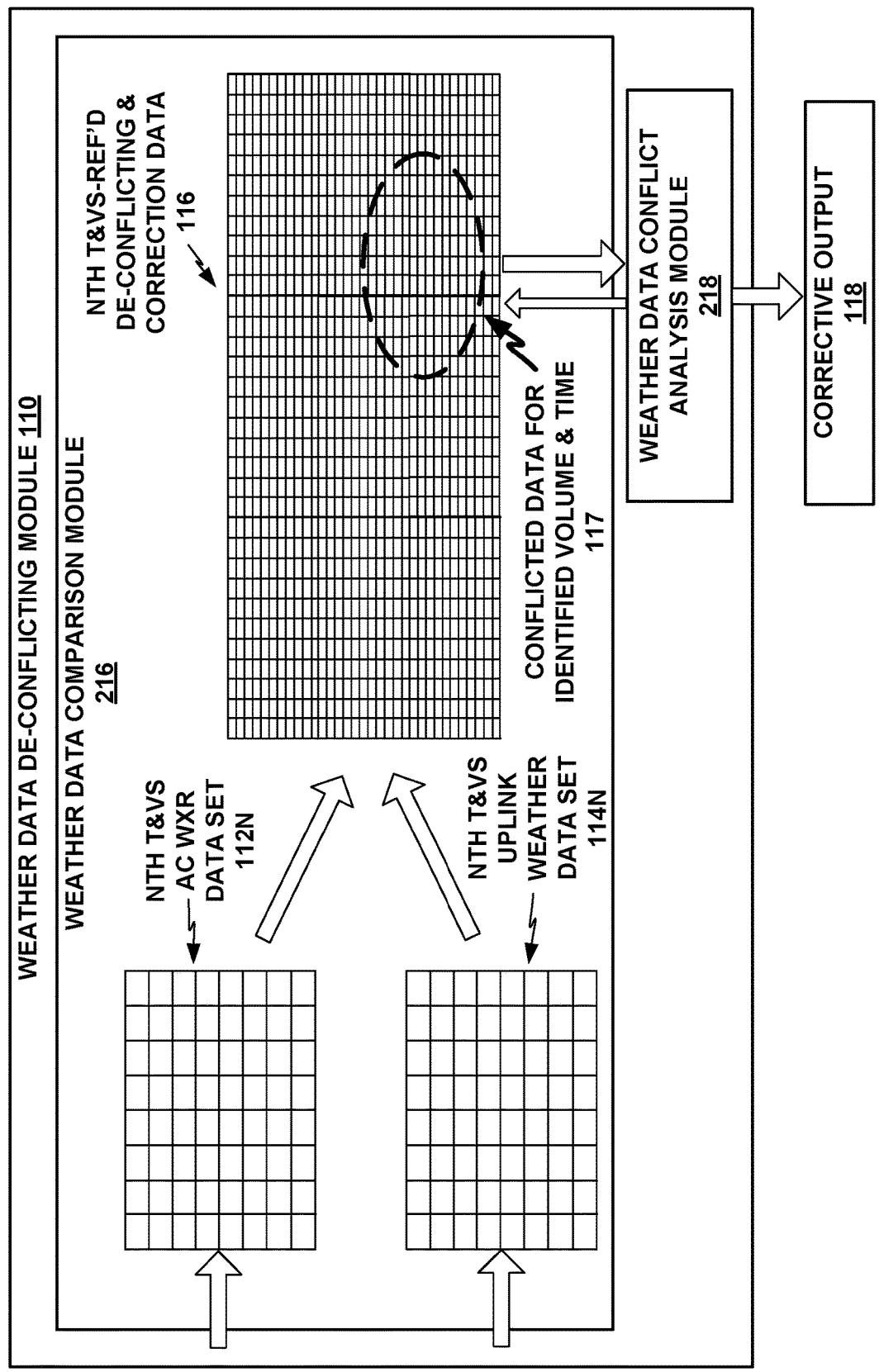
FIG. 4 depicts a conceptual block diagram of a weather data de-conflicting system comparing weather data sets for the same time and place from an onboard weather radar system and a weather data uplink service, verifying or de-conflicting the different weather data sets, and generating a corrective output in response to a de-conflicting analysis of the different weather data sets, in accordance with one example of the disclosure.

FIG. 4 depicts a conceptual block diagram of a weather data de-conflicting module 110 comparing weather data sets 112N, 114N for the same or otherwise overlapping time and volume of space from an onboard weather radar system 120 and a weather data uplink service 140 respectively, verifying or de-conflicting the different weather data sets 112N, 114N, and generating de-conflicting and correction data 116 including a corrective weather data output 244 in response to a de-conflicting analysis of the different weather data sets, in accordance with one example of the disclosure. In this example, weather data de-conflicting module 110 includes a weather data comparison module 216 and a weather data conflict analysis module 218. Weather data comparison module 216 may receive sets of weather data referenced to specific times and volumes of space, including time and volume of space referenced aircraft weather radar data sets 112 (or "T&VS AC WXR data set 112" as shown in FIG. 4) and time and volume of space referenced uplink weather data sets 114. Uplink weather data sets 114 may be any data sets received via uplink via datalink system 124 and may include weather data sets from weather data aggregating system 150.

Weather data sets 112N, 114N may also be time referenced and geographically referenced, such that they include identifying data or metadata matching them with certain times and volumes of space in the sky referenced by geography and altitude, of where the data were collected. These time references and geographic references in the metadata of the weather data sets 112N, 114N may be included by the data collecting sources such as weather data system 120 and weather data aggregating system 150 in their data processing prior to transmitting their data to weather data de-conflicting system 100. Weather data sets 112N, 114N are conceptually depicted in grid form in FIG. 4 to indicate that they are geographically and altitude referenced volumetric data sets in which the data may be implemented in the form of arrays, vectors, or other ordered form that preserves the three-dimensional Earth-referenced, altitude-referenced, and time-referenced volumetric geographical form of the data, representing and referencing the time and the three-dimensional geographical volume of space from which the weather data set was taken.

Weather data comparison module 216 and weather data conflict analysis module 218 may be embodied or implemented in any form of executable software instruction code and/or general or specialized processing hardware as discussed above with reference to weather data de-conflicting module 110. Weather data de-conflicting module 110, including weather data comparison module 216 and weather data conflict analysis module 218, may execute on processors 102 of a weather data de-conflicting system 100 as shown in FIG. 3, such that the functions and processes embodied and performed by weather data de-conflicting module 110 may be embodied and performed by processors 102 configured by executable software instruction code corresponding to weather data de-conflicting module 110 that is loaded on memory 104 and/or stored on data storage 106 as shown in FIG. 3.

Aircraft weather radar data sets 112 may take the form of two-dimensional or three-dimensional aircraft weather radar scanning image data from aircraft weather radar system 120. Uplink weather data sets 114 may take any of a variety of forms, and in some examples may be aggregated from various different original data formats into a conforming data format as a two-dimensional or three-dimensional aircraft weather radar data format, to facilitate display on weather data display system 122. Uplink weather data sets 114 may have a different resolution and/or a different signal-to-noise ratio (SNR) compared with aircraft weather radar data sets 112. The individual data sets of both aircraft weather radar data sets 112 and uplink weather data sets 114 may also have varying resolution and/or SNR internally across a single data set.

Weather data comparison module 216 compares aircraft weather radar data sets 112 and uplink weather data sets 114. Weather data comparison module 216 may identify a particular aircraft weather radar data set 112N and a particular uplink weather data set 114N that as being from the same or otherwise overlapping volume of space and the same or otherwise overlapping period of time. Weather data comparison module 216 may compare weather data corresponding to individual positions and times according to both aircraft weather radar data set 112N and uplink weather data set 114N, and determine whether the two different weather data sets 112N and 114N are in accordance with each other and confirm each other, or whether there is a discrepancy between them. There may often or always be some measurable difference in aspects of weather data, such as radar reflectivity, for overlapping times and positions between weather data sets 112N and 114N, within nominal differentials even under ideal conditions of measuring with high resolution and high SNR. Weather data comparison module 216 may account for and make allowance for nominal differentials or error significance interval bars in the data for a corresponding position and point in time between weather data sets 112N and 114N.

Weather data comparison module 216 may determine if discrepancies occur or can be measured in any one or more aspects of weather data, such as radar reflectivity, for the same or otherwise overlapping volume of space and period of time, that is greater than a nominal or expected differential or error interval. The nominal or expected differential or error interval may be different under different conditions or circumstances, and weather data comparison module 216 may adjust its standard for evaluating differentials between the data sets based on differences in underlying conditions affecting the expected measurement error interval, based on standard techniques of signal analysis (e.g., for radar signals) and error analysis.

If weather data comparison module 216 does not detect a discrepancy between an aspect of weather data for a same or otherwise overlapping volume of space and a same or otherwise overlapping period of time from weather data sets 112N and 114N that is greater than an expected error interval, then weather data comparison module 216 may verify or confirm the corresponding portions of weather data as in accordance with each other. Weather data comparison module 216 may generate an output indicating the weather data sets 112N and 114N to be verified as mutually consistent.

On the other hand, if weather data comparison module 216 detects a discrepancy between an aspect of weather data for a same or otherwise overlapping volume of space and a same or otherwise overlapping period of time from weather data sets 112N and 114N that is greater than an expected error interval, then weather data comparison module 216 may identify and flag the corresponding portions of data from the two weather data sets 112N and 114N for further analysis by weather data conflict analysis module 218. For instance, in the example of FIG. 4, weather data comparison module 216 may identify data from a specific portion of volume of space 117 from the specific time interval from weather data sets 112N and 114N as having a significant discrepancy between them ("conflicted weather data 117"). Weather data comparison module 216 may indicate or identify the flagged conflicted weather data 117 to weather data conflict analysis module 118. Weather data comparison module 216 may communicate the conflicted weather data 117 to weather data conflict analysis module 118, or weather data conflict analysis module 118 may access the conflicted weather data 117 from the combined de-conflicting and correction data 116, or otherwise from the individual original weather data sets 112N and 114N.

Weather data conflict analysis module 118 may then analyze the conflicted weather data 117 from weather data sets 112N and 114N and evaluate which of the weather data sets 112N and 114N is more likely to be accurate or reliable. This may include evaluating the relative resolution of weather data sets 112N and 114N, evaluating the relative SNR of weather data sets 112N and 114N, evaluating the relative proximity to the subject weather of the conflicted weather data 117 of the original one or more data gathering systems that obtained weather data sets 112N and 114N, evaluating the reliability or precision of the data gathering instrumentation and communication systems responsible for gathering the weather data sets 112N and 114N, evaluating a difference in time of data gathering of weather data sets 112N and 114N and to what extent the passage of time after the older of the two data sets might account for the discrepancy, and/or evaluating other potentially relevant factors.

In some examples, weather data de-conflicting module 110 may be configured to compare the aircraft weather radar data sets 112 and uplink weather data sets 114 asynchronously from receiving, identifying, and/or storing the incoming aircraft weather radar data sets 112 and uplink weather data sets 114, and match the aircraft weather radar data sets 112 and uplink weather data sets 114 from the same or overlapping time periods and from the same or overlapping volumes of space, which may enable flexibility to take advantage of varying rates of incoming data, in some examples. In some examples, weather data de-conflicting module 110 may be configured to load the aircraft weather radar data sets 112 and uplink weather data sets 114 directly into memory 104 from first receiving aircraft weather radar data sets 112 and uplink weather data sets 114, and to perform the comparison and de-conflicting analysis of aircraft weather radar data set 112N and uplink weather data set 114N with the weather data sets 112N and 114N in memory 104 and with conflicted weather data 117 maintained in memory 104 during operations for the de-conflicting analysis, without necessarily storing any of the data to and then retrieving the data from data storage 106. Maintaining the relevant data in memory 104 throughout de-conflicting analysis may facilitate rapid performance of the de-conflicting analysis and rapid generation of the de-conflicting outputs in some examples. In some other examples, weather data de-conflicting module 110 may make use of data storage 106 for storing and retrieving at least some data involved in performing a de-conflicting analysis, and may use a schemaless data store, a rapid access database, or other rapid data access technology to facilitate performing de-conflicting analysis and generating de-conflicting outputs rapidly.

In some examples, weather data de-conflicting module 110 may also store and maintain parameters or policies, such as selected error significance thresholds or data discrepancy significance thresholds that may be selected or defined by an operator or user. Weather data de-conflicting module 110 may receive updates to the parameters or policies from an operator or user at times. In some examples, weather data de-conflicting module 110 may also perform security, validation, and/or authentication for incoming data received via datalink system 124.

In some examples, weather data de-conflicting system 100 may also homogenize or clean up weather data from different sources according to known potentially confusing factors in the data, such as by canceling ground surface feature reflections from weather radar data or other weather data, if such canceling was not previously done by the supplying system, prior to performing a de-conflicting analysis. For example, weather data de-conflicting system 100 may have access to a global database or other data store of ground surface physical geography for the ground surface of the Earth or substantial areas thereof. Weather data de-conflicting system 100 may then compare weather radar components of the weather data sets received from at least one of the weather data sources with the data store of ground surface physical geography, and cancel radar reflection data from ground surfaces from the weather radar components of the received weather data, based at least in part on the comparing of the one or more weather radar components of the received weather data with the data store of ground surface physical geography, prior to performing a de-conflicting analysis. That is, portions of received weather radar data from one or more weather radar data sources may be due to radar reflections from ground surfaces rather than from weather features, and comparison of the weather radar data with the ground surface geography data store by weather data de-conflicting system 100 may enable weather data de-conflicting system 100 to cancel out this ground surface data as part of its process of performing a de-conflicting analysis, to reduce or eliminate known obfuscating factors from a comparison of different weather data sets.

In some examples, weather data de-conflicting module 110 may identify a particular weather feature such as a convective weather cell in the weather data sets 112N and 114N that corresponds to conflicted weather data 117. In one example, data de-conflicting module 110 may identify conflicted weather data 117 with convective weather cell 92 as shown in FIG. 1, as further described below with reference to FIG. 6.

Figure 5:
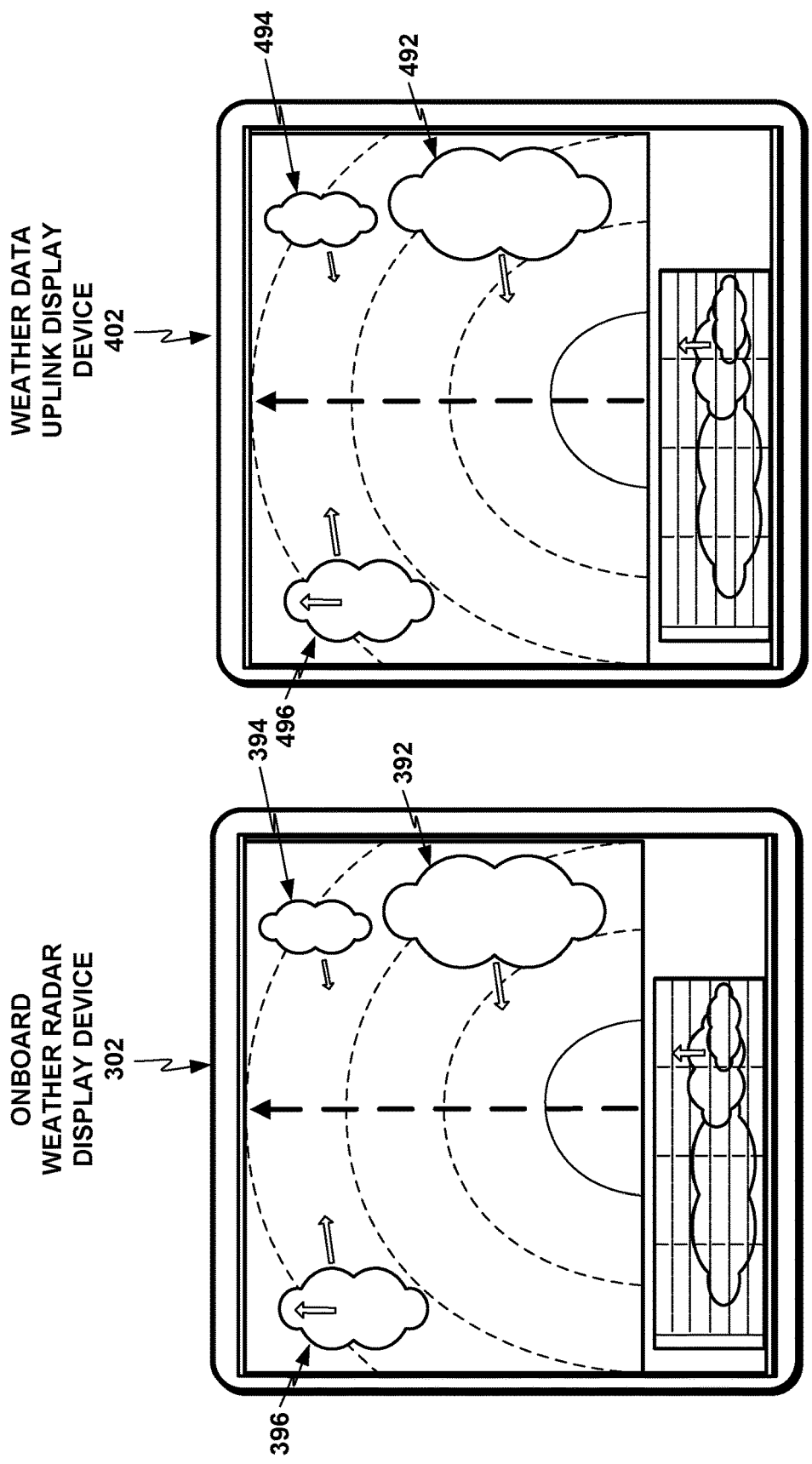
FIG. 5 depicts a conceptual diagram of an onboard electronic weather display device displaying weather data from an onboard weather radar system and an onboard electronic weather display device displaying weather data from a weather data aggregating system, where a weather data de-conflicting system has verified that the weather data sets from the two sources are mutually consistent, in accordance with one example of the disclosure.

FIG. 5 depicts a conceptual diagram of an onboard electronic weather display device 302 displaying weather data from an onboard weather radar system 120 and an onboard electronic weather display device 402 displaying weather data from a weather data aggregating system 150, where a weather data de-conflicting system 100 has verified that the weather data sets 112N and 114N from the two sources are mutually consistent, in accordance with one example of the disclosure. Onboard electronic weather display device 302 and onboard electronic weather display device 402 may be the same onboard display device, e.g., onboard weather data display system 122, showing two different views at different times based on the two different data sources of onboard weather radar system 120 and weather data aggregating system 150.

Onboard electronic weather display device 302 depicts weather feature representations 392, 394, 396 (labeled in a horizontal view and also shown unlabeled in a vertical view) that correspond to convective weather features 92, 94, 96 shown in FIG. 1, and onboard electronic weather display device 402 depicts weather feature representations 492, 494, 496 that also correspond to convective weather features 92, 94, 96. Onboard electronic weather display devices 302 and 402 respectively depict data corresponding to instances of aircraft weather radar data 112 from onboard weather radar system 120 and uplink weather data 114 from weather data aggregating system 150 from a same or otherwise overlapping time interval and volume of space when the two sets of data are mutually consistent, at least within nominal, expected differentials. Onboard electronic weather display devices 302 and 402 may also show an explicit indication (not shown in FIG. 5) generated by weather data de-conflicting system 100 that the data from the different sources has been verified as mutually consistent.

Figure 6:
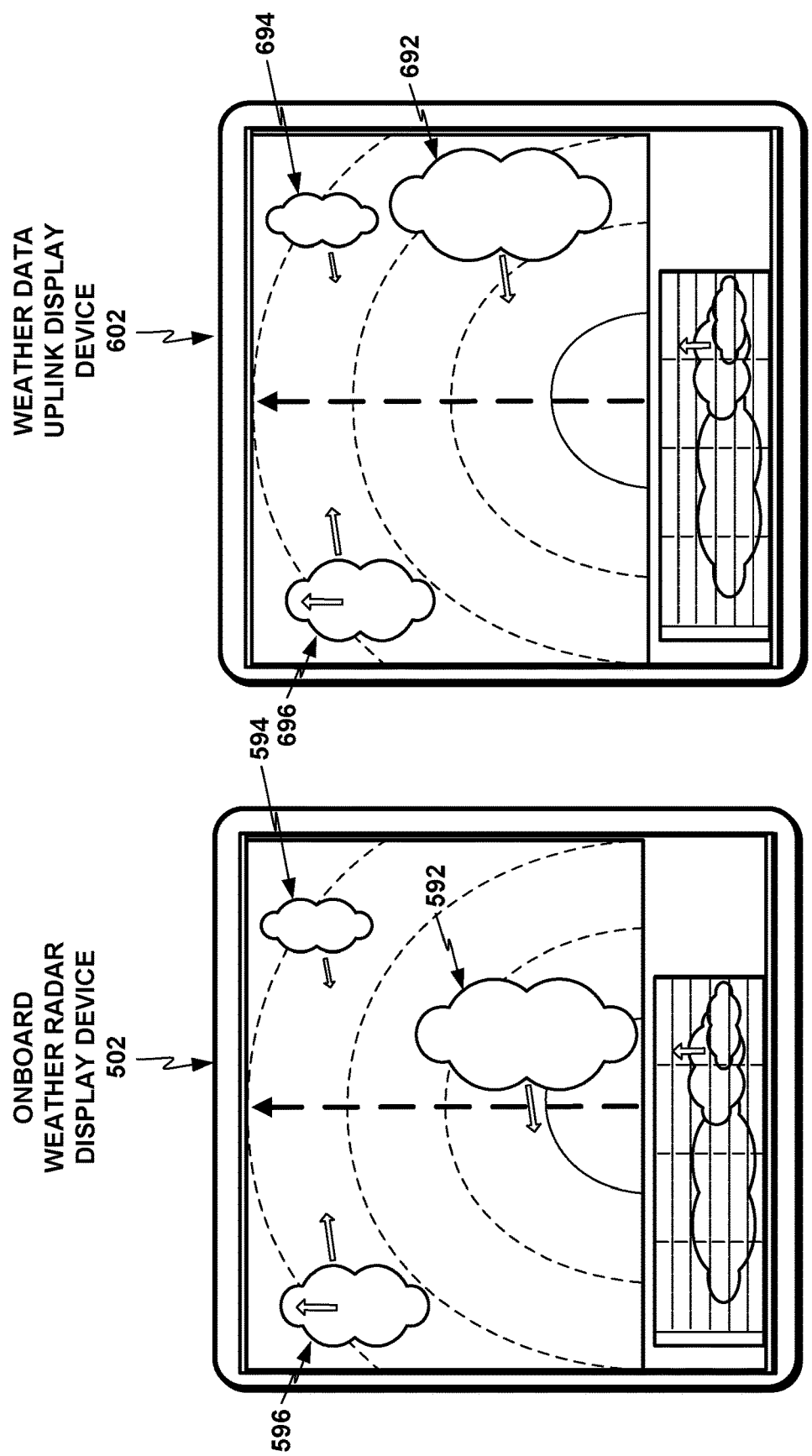
FIG. 6 depicts a conceptual diagram of an onboard electronic weather display system displaying weather data from an onboard weather radar system in a first panel and weather data from a weather data uplink service in a second panel, where a weather data de-conflicting system has flagged the weather data from the two sources as conflicted, has performed a de-conflicting analysis, and has designated and generated a corrective output, in accordance with one example of the disclosure.

FIG. 6 depicts a conceptual diagram of an onboard electronic weather display device 502 displaying weather data from an onboard weather radar system 120 and an onboard electronic weather display device 602 displaying weather data from a weather data aggregating system 150, where a weather data de-conflicting system 100 has flagged the weather data from the two sources as conflicted, has performed a de-conflicting analysis, and has designated and generated a corrective output, in accordance with one example of the disclosure. As in FIG. 5, onboard electronic weather display device 502 and onboard electronic weather display device 602 may be the same onboard display device, e.g., onboard data display system 122, showing two different views at different times based on the two different data sources of onboard weather radar system 120 and weather data aggregating system 150.

As in FIG. 5, onboard electronic weather display device 502 depicts weather feature representations 592, 594, 596 (labeled in a horizontal view and also shown unlabeled in a vertical view) that correspond to convective weather features 92, 94, 96 shown in FIG. 1, and onboard electronic weather display device 602 depicts weather feature representations 692, 694, 696 that also correspond to convective weather features 92, 94, 96, except that in the example of FIG. 6, weather data de-conflicting system 100 has determined that the data between the two sources is not mutually consistent and instead is conflicted. In particular, onboard electronic weather display device 502 depicts weather feature representation 592 representing convective weather cell 92 as being close to the own aircraft and close to the forward trajectory of the own aircraft, while onboard electronic weather display device 602 depicts weather feature representation 692 representing convective weather cell 92 as being more distant from the own aircraft and farther out of the way of the forward trajectory of the own aircraft.

As in FIG. 5, onboard electronic weather display devices 502 and 602 respectively depict data corresponding to instances of aircraft weather radar data 112 from onboard weather radar system 120 and uplink weather data 114 from weather data aggregating system 150 from a same or otherwise overlapping time interval and volume of space when the two sets of data are conflicted, or are mutually different from each other outside the range of nominal, expected differentials. Onboard electronic weather display devices 502/602 may also show an explicit indication or alert (not shown in FIG. 5) generated by weather data de-conflicting system 100 that the data from the different sources has been flagged as conflicted. Onboard electronic weather display devices 502/602 may also render the display of the data as shown in FIG. 6 with graphical elements to emphasize the conflict, such as highlighting or different colors superimposed on areas representing conflicted data, e.g., weather feature representations 592 and 692.

In some examples, weather data de-conflicting system 100 may also generate a result from performing its de-conflicting analysis, based on one or more of a variety of possible factors evaluated by weather data de-conflicting system 100, that the aircraft weather radar data 112 from onboard weather radar system 120 is more accurate or more reliable than uplink weather data 114 from weather data aggregating system 150. For example, weather data de-conflicting system 100 may determine that the aircraft weather radar data 112 from onboard weather radar system 120 was taken from more proximate to weather cell 92, was taken more recently, has higher resolution, has higher SNR, and/or has less intervening and interfering weather features, compared to the data sources on which uplink weather data 114 from weather data aggregating system 150 is based. As a particular example, uplink weather data 114 from weather data aggregating system 150 may be based at least in part on NexRad ground-based weather data which can be delayed by ten minutes or more, while aircraft weather radar data 112 from onboard weather radar system 120 may provide much more recent coverage of the same or otherwise overlapping volume of space.

Weather data de-conflicting system 100 may generate a de-conflicting output by indicating the display of the weather feature representation 592 based on the aircraft weather radar data 112 from onboard weather radar system 120 as displayed on onboard electronic weather display devices 502 in FIG. 6 as the accurate representation, and/or flagging or warning that the display of the weather feature representation 692 based on the uplink weather data 114 from weather data aggregating system 150 as displayed on onboard electronic weather display devices 602 in FIG. 6 is not accurate and should be disregarded in favor of the data as displayed on onboard electronic weather display devices 502.

In some other examples, weather data de-conflicting system 100 may also generate a result from performing its de-conflicting analysis, based on one or more of a variety of possible factors evaluated by weather data de-conflicting system 100, that neither of the aircraft weather radar data 112 from onboard weather radar system 120 and the uplink weather data 114 from weather data aggregating system 150 can be determined to be definitively more accurate than the other, due to any of a variety of potential factors. For example, one or other of the data sources may have higher resolution, higher SNR, originate from a more proximate position, and/or originate from a more recent time, but only marginally and not so much to exceed a nominal margin of measurement error or confidence interval. In examples such as this, weather data de-conflicting system 100 may generate a de-conflicting output in which data from both sources is displayed with an indication that the data are inconsistent but that neither can be definitively established as more accurate. In examples such as this, weather data de-conflicting system 100 may generate a weighted average of the conflicting data as a de-conflicting output, and thereby generate a representation of convective weather cell 92 at an intermediate position between the relative positions of weather feature representations 592 and 692 as shown in FIG. 6, for example.

This de-conflicting output may be weighted in such a way as to account properly for the marginal superiority of resolution, SNR, or other confidence-enhancing factor of one of the sources of data. For example, weather data de-conflicting system 100 may determine that aircraft weather radar data 112 from onboard weather radar system 120 is marginally more likely to be accurate than uplink weather data 114 from weather data aggregating system 150, may calculate a relative confidence (e.g., representation of higher resolution, higher SNR, or other relevant factors) of aircraft weather radar data 112 compared to uplink weather data 114, and may multiply or otherwise combine the aircraft weather radar data 112 compared to uplink weather data 114 with their respective confidence indicators, and thereby generate a weighted combined output as a de-conflicting output. The weighted combined output may take the form of a weather feature representation (not separately shown) that is between weather feature representations 592 and 692 as shown in FIG. 6 but relatively closer to the position of weather feature representation 592.

Weather data de-conflicting system 100 may thus be configured to determine an accuracy of the first set of weather data, and include, in the corrective output, the determined accuracy of the first set of weather data. Weather data de-conflicting system 100 may also be configured to determine a relative accuracy between the first set of weather data and the second set of weather data, and include, in the corrective output, the determined relative accuracy between the first set of weather data and the second set of weather data, or an indication that the relative accuracy between the first set of weather data and the second set of weather data is ambiguous. In cases in which weather data de-conflicting system 100 determines that the relative accuracy between the two conflicted data sets is ambiguous, weather data de-conflicting system 100 may include, in the corrective output, a weighted average of the first set of weather data and the second set of weather data.

In another example (not shown in FIG. 6), weather data aggregating system 150 may provide weather data to aircraft 10 in flight including codes 255653 and 256466 in wind aloft data for the area of the Phoenix, Arizona airport (PHX) at altitude 34,000 feet and 39,000 feet, respectively, while aircraft 10 is cruising in the area of PHX at 35,000 feet. However, sensors onboard aircraft 10 then show a sensed wind speed stable at 160 degrees at 60 knots, and with temperature of −55° C., which weather data de-conflicting system 100 may determine form a significantly large differential from the values extrapolated from the wind aloft codes for 35,000 feet. Weather data de-conflicting system 100 finds a significantly large differential between the data from the onboard systems of aircraft 10 and the weather data received from weather data aggregating system 150. Weather data de-conflicting system 100 thus, in response to detecting this significant differential between the conflicting sets of data, performs a de-conflicting analysis to evaluate which set of conflicting data has higher confidence or lower expected error (e.g., higher resolution, higher SNR, greater proximity, more recent), and may determine that the aircraft sensor data is more likely to be correct because it is from direct local sensor measurements and because the measurements are from a more recent time, relative to the weather data received from weather data aggregating system 150.

Weather data de-conflicting system 100 then generates a corrective output comprising the corresponding more accurate data from the onboard aircraft sensors, in response to determining that the data from weather data aggregating system 150 and from the onboard systems are conflicted and that the onboard data is more accurate. Weather data de-conflicting system 100 then initiates and generates a corrective output that includes wind speed and direction data and potentially other weather data from the onboard systems, and with associated position, altitude, and time tags or metadata, and downlinks the corrective output to weather data aggregating system 150 via onboard datalink system 124 and datalink service 140.

Weather data aggregating system 150 may thus receive and incorporate the onboard aircraft system data selected and downlinked by weather data de-conflicting system 100. Weather data aggregating system 150 may perform its own process to seek to compare, confirm, or verify the weather data from the corrective output from weather data de-conflicting system 100 from aircraft 10 in view of data from other aircraft and/or other weather data sources, and may then incorporate the data from the corrective output into its data that weather data aggregating system 150 subsequently disseminates to various aircraft. Aircraft 10 may thus help ensure that weather data aggregating system 150 maintains accurate data, with aircraft 10 only downlinking data selectively or occasionally, under the control of weather data de-conflicting system 100, rather than aircraft 10 simply downlinking wind and temperature data to weather data aggregating system 150 at regular intervals, e.g., every five minutes, when most of that data would be duplicative with the data already possessed by weather data aggregating system 150.

In another example (not shown in FIG. 6), weather data aggregating system 150 may provide sophisticated weather information including weather data such as as weather condition snapshot and trend information. Weather data aggregating system 150 may uplink weather information to aircraft 10 indicating a low altitude convective weather system on the flight route of aircraft 10, and that the low altitude convective weather system is developing vertically, with cloud tops rising in altitude upward toward the flight route of aircraft 10. The weather information from weather data aggregating system 150 also provides an indication in the trend data that shows that the vertical rise of the cloud tops in the low altitude convective weather system is slow and is not projected to intersect the flight path of aircraft 10 until substantially after aircraft 10 has already passed by the area, so that the low altitude convective weather system is not projected to interfere with the flight plan of aircraft 10.

However, in this example when aircraft 10 approaches the portion of its flight path proximate to the low altitude convective weather system, its onboard weather radar system 120 returns signals showing strong reflection at the same horizontal location as the low altitude convective weather system shown in the weather data from weather data aggregating system 150, but at a much higher altitude than indicated in the weather information from weather data aggregating system 150. The radar scans from onboard weather radar system 120 measure and identify the tops of the clouds of the low altitude convective weather system. Weather data de-conflicting system 100 may determine that the radar return signals from onboard weather radar system 120 have higher resolution and higher SNR and were directly measured from closer to and more recently than the sources of the weather data from weather data aggregating system 150 projecting the weather cell to be at lower altitude and with slower vertical growth trend. Weather data de-conflicting system 100 thus determines that the signals from onboard weather radar system 120 constitute more accurate weather data for the volume of space and the time interval corresponding to the space and time of the weather cell as scanned by onboard weather radar system 120. Weather data de-conflicting system 100 generates a corrective output comprising the radar signal data covering of the weather cell as scanned by onboard weather radar system 120, and transmits that corrective output back to weather data aggregating system 150.

Weather data aggregating system 150 may receive the corrective output from weather data de-conflicting system 100. Weather data aggregating system 150 may perform some one or more steps to validate or confirm the corrective output from weather data de-conflicting system 100, such as to request new data from other proximate aircraft or from other weather data collecting assets with coverage of the volume of space of the weather cell. Weather data aggregating system 150 may then incorporate the data from the corrective output into its own database, potentially fusing the data from the corrective output with other updated data such as incoming data in response to requests to validate the corrective output, and new data from subsequent NexRad radar updates. Thus, weather data de-conflicting system 100 can increase the accuracy of the weather data provided by weather data aggregating system 150 by making only limited, targeted, occasional transmissions to weather data aggregating system 150 and without the potential expense and burden of making regular datalink transmissions, most of which might only be cumulative or redundant with data already possessed by weather data aggregating system 150. In some examples, weather data de-conflicting system 100 may still be configured to transmit some data to weather data aggregating system 150 on a limited regular or irregular basis, but to increase a rate of transmitting weather data to weather data aggregating system 150 in response to determining that the difference between the first set of weather data and the second set of weather data is above the nominal threshold of difference.

The corrective output generated by weather data de-conflicting system 100 may include an entire data set from the onboard systems, or just differential data that indicates the difference between the weather data originally uplinked by weather data aggregating system 150 and the data determined to be more accurate, in various examples. For example, the differential data may be a contour line or a geometrical center of a weather system defined by a displacement to a baseline reference from the weather data originally uplinked by weather data aggregating system 150. In some examples, the differential data for the corrective output may be a differential value or correction value in reflectivity strength, vertical trend, lateral moving vectors, ambient temperature updates, or a combination of the above and/or other weather data values.

Figure 7:
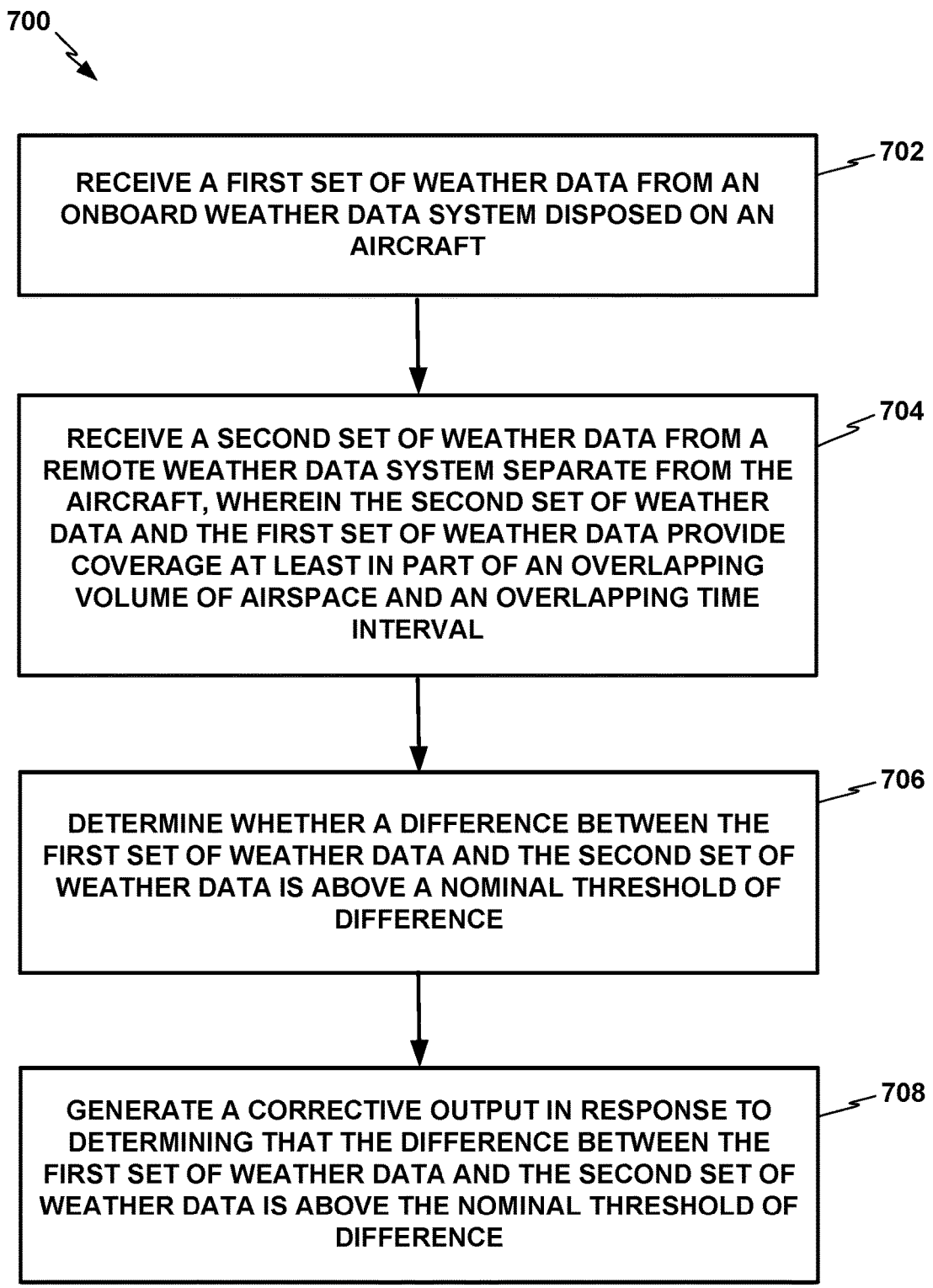
FIG. 7 shows a flowchart for an example method for de-conflicting weather data from an onboard weather radar and a weather data uplink service, as may be implemented, performed, executed, and/or embodied by a weather data de-conflicting system in various examples of this disclosure.

FIG. 7 shows a flowchart for an example method 700 for de-conflicting weather data sets, as may be implemented, performed, executed, and/or embodied by a weather data de-conflicting system in various examples of this disclosure. Method 700 includes receiving a first set of weather data from an onboard weather data system disposed on an aircraft (e.g., weather data de-conflicting system 100 receiving one or more sets of weather data from onboard weather radar system 120, air data system 126, inertial navigation system 128, an icing detection system, a GPWS) (702). Method 700 further includes receiving a second set of weather data from a remote weather data system separate from the aircraft, wherein the second set of weather data and the first set of weather data provide coverage at least in part of an overlapping volume of airspace and an overlapping time interval (e.g., weather data de-conflicting system 100 receiving one or more sets of weather data from weather data aggregating system 150 via datalink service 140) (704).

Method 700 further includes determining whether a difference between the first set of weather data and the second set of weather data is above a nominal threshold of difference (e.g., weather data de-conflicting module 110, weather data comparison module 216 of weather data de-conflicting system 100 comparing weather data sets 112, 114 to determine whether a difference between the first set of weather data and the second set of weather data is above an expected or nominal error threshold or differential or other nominal threshold of difference, as discussed above) (706). Method 700 further includes generating a corrective output in response to determining that the difference between the first set of weather data and the second set of weather data is above the nominal threshold of difference (e.g., weather data de-conflicting module 110, weather data conflict analysis module 218 of weather data de-conflicting system 100 analyzing identified conflicted data 117 between weather data sets 112N, 114N, evaluating the relative accuracy, precision, source proximity, recency, SNR, or other relevant factor of the conflicted data, and determining whether to designate a particular portion of one of the data sets as a corrective output, or generating a weighted product or other combination of the data sets as a corrective output, or otherwise generating a corrective output, and communicating or outputting the corrective output, e.g., for transmission to weather data aggregating system 150 via datalink service 140) (708).

In weather data de-conflicting system 100, the processors 102, memory 104, data storage 106, and communication interface 108 are interconnected by communication channels 109, such as a bus or communication fabric, for transporting data and instruction code between processors 102, memory 104, and data storage 106. Processors 102 may include one or more central processing units (CPUs), one or more CPU cores, one or more GPUs, ASICs, or any other type of processing circuitry. Memory 104 may include any form of working memory, such as any form of random access memory (RAM). Data storage 106 may include any form of hard disc drives, redundant array of independent discs (RAID), Flash drives, cloud storage, or any other form of data storage, and may host any form of databases, schemaless data stores, or any type of data stores. Weather data de-conflicting system 100 may process incoming data and outgoing data via communication interface 108, which may include or be operatively coupled to interface subsystems and transceivers for managing data communications via datalink service 140.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of weather data de-conflicting system 100 and/or processors 102 thereof, and/or system elements for executing and/or storing weather data de-conflicting module 110 or features thereof as disclosed above, may be implemented in any of a variety of types of solid state circuit elements, such as CPUs, CPU cores, GPUs, digital signal processors (DSPs), ASICs, a magnetic nonvolatile RAM or other types of memory, a mixed-signal integrated circuit, an FPGA, a microcontroller, a programmable logic controller (PLC), a programmable logic device (PLD), a complex programmable logic device (CPLD), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed herein to weather data de-conflicting module 110.

The above examples are examples of tangible computer-readable storage media which are non-transitory. Aspect of this disclosure, however, may also be implemented in a communication medium such as a signal or carrier wave. Thus, computer readable media may be any available media that can be accessed by one or more computers or one or more processors to retrieve instructions, code and/or data structures for implementation of the techniques described in this disclosure. A computer program product may include a computer-readable medium.

Elements of weather data de-conflicting module 110 may be programmed with various forms of software. Weather data de-conflicting module 110 may be implemented at least in part as, or include, one or more executable applications, application modules, libraries, classes, methods, objects, routines, subroutines, firmware, and/or embedded code, for example. Elements of weather data de-conflicting module 110 as in any of the examples herein may be implemented as a device, a system, an apparatus, and may embody or implement a method of comparing and de-conflicting weather data from multiple sources and generating weather data correction outputs, including for implementing example method 700 as described with reference to FIG. 7. Weather data de-conflicting module 110 may configure processors 102 to receive a first set of weather data from an onboard weather data system; receive a second set of weather data from a remote weather data system separate from the aircraft such as weather data aggregating system 150, wherein the second set of weather data and the first set of weather data provide coverage at least in part of an overlapping volume of airspace and an overlapping time interval; determine whether a difference between the first set of weather data and the second set of weather data is above a nominal threshold of difference; generate a corrective output in response to determining that the difference between the first set of weather data and the second set of weather data is above the nominal threshold of difference; and perform any other functions described herein.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). "Weather information" may be considered to be a form of and included in "weather data" for purposes of this disclosure. While some examples are described in terms of weather data de-conflicting system 100 comparing weather radar data from an onboard weather radar system on aircraft 10 and baseline uplink weather data from a weather data uplink service such as weather data aggregating system 150, in other examples, weather data de-conflicting system 100 may compare, verify, and/or de-conflict weather data from any two or more sources, and generate de-conflicting or corrective outputs based on comparing, verifying, and/or de-conflicting weather data from any two or more sources. Weather data de-conflicting system 100 may communicate such de-conflicting or corrective outputs to any of a variety of receiving systems for any of a variety of useful applications.

Various illustrative aspects of the disclosure are described above. These and other aspects are within the scope of the following claims.

What is claimed is:

1. A system comprising one or more processors configured to:
   receive a first set of weather data from an onboard weather data system disposed on an aircraft;
   receive a second set of weather data from a remote weather data system separate from the aircraft, wherein the second set of weather data and the first set of weather data provide coverage at least in part of an overlapping volume of airspace and an overlapping time interval;
   determine whether a difference between the first set of weather data and the second set of weather data is above a nominal threshold of difference; and
   generate a corrective output in response to determining that the difference between the first set of weather data and the second set of weather data is above the nominal threshold of difference.

2. The system of claim 1, wherein the corrective output comprises at least a portion of the first set of weather data corresponding to the overlapping volume of airspace and the overlapping time interval.

3. The system of claim 1, wherein the corrective output comprises a corrective data set corresponding to the overlapping volume of airspace and the overlapping time interval.

4. The system of claim 1, wherein the corrective output comprises an indication of the difference between the first set of weather data and the second set of weather data.

5. The system of claim 1, wherein the corrective output comprises an alert indicative of the determining that the difference between the first set of weather data and the second set of weather data is above the nominal threshold of difference.

6. The system of claim 1, wherein the system is further configured such that determining the difference between the first set of weather data and the second set of weather data comprises determining a difference between the first set of weather data and the second set of weather data in one or more of:
   a horizontal motion of one or more weather features;
   a vertical trend of one or more weather features; and
   a reflectivity trend of one or more weather features.

7. The system of claim 1, wherein at least one of the first set of weather data and the second set of weather data comprises data indicative of one or more of: a lateral motion of a weather feature, a tangential motion of a weather feature, a radial motion of the a weather feature, a vertical trend of a weather feature, a reflectivity trend of a weather feature, lightning, ice, hail, wind shear, and clear air turbulence (CAT).

8. The system of claim 1, wherein the system is further configured to:
   determine an accuracy of the first set of weather data; and
   include, in the corrective output, the determined accuracy of the first set of weather data.

9. The system of claim 1, wherein the system is further configured to:
   determine a relative accuracy between the first set of weather data and the second set of weather data; and
   include, in the corrective output, the determined relative accuracy between the first set of weather data and the second set of weather data.

10. The system of claim 1, wherein the system is further configured to:
    determine whether a relative accuracy between the first set of weather data and the second set of weather data is ambiguous; and
    include, in the corrective output, an indication that the relative accuracy between the first set of weather data and the second set of weather data is ambiguous.

11. The system of claim 1, wherein the system is further configured to:
    determine whether a relative accuracy between the first set of weather data and the second set of weather data is ambiguous; and
    include, in the corrective output, a weighted average of the first set of weather data and the second set of weather data.

12. The system of claim 1, wherein the system is further configured to:
    initiate a review of accuracy of other sets of weather data in response to determining that the difference between the first set of weather data and the second set of weather data is above the nominal threshold of difference, wherein the overlapping volume of airspace is a first overlapping volume of airspace and the overlapping time interval is a first overlapping time interval, and the system is further configured such that the review of accuracy is directed to a second overlapping volume of airspace overlapping or proximate to the first overlapping volume of airspace and a second overlapping time interval overlapping or proximate to the first overlapping time interval.

13. The system of claim 1, wherein the system is integrated with at least one of an onboard weather radar processing system or an onboard weather data display system.

14. The system of claim 1, wherein the onboard weather data system comprises one or more of: an onboard weather radar system, an onboard air data system, and an onboard inertial navigation system.

15. The system of claim 1, wherein the system is further configured to transmit the corrective output to a data aggregating system external to the aircraft.

16. The system of claim 1, wherein the system is further configured to increase a rate of transmitting weather data to a weather data aggregating system external to the aircraft, in response to determining that the difference between the first set of weather data and the second set of weather data is above the nominal threshold of difference.

17. A method comprising:
receiving, with one or more processors, a first set of weather data from an onboard weather data system disposed on an aircraft;
receiving, with the one or more processors, a second set of weather data from a remote weather data system separate from the aircraft, wherein the second set of weather data and the first set of weather data provide coverage at least in part of an overlapping volume of airspace and an overlapping time interval;
determine, with the one or more processors, whether a difference between the first set of weather data and the second set of weather data is above a nominal threshold of difference; and
generate, with the one or more processors, a corrective output in response to determining that the difference between the first set of weather data and the second set of weather data is above the nominal threshold of difference.

18. The method of claim 17, wherein the corrective output comprises at least a portion of the first set of weather data corresponding to the overlapping volume of airspace and the overlapping time interval.

19. A device comprising:
one or more processors; and
a computer-readable storage medium operatively coupled to the one or more processors and comprising executable instructions that configure the one or more processors to:

receive a first set of weather data from an onboard weather data system disposed on an aircraft;

receive a second set of weather data from a remote weather data system separate from the aircraft, wherein the second set of weather data and the first set of weather data provide coverage at least in part of an overlapping volume of airspace and an overlapping time interval;

determine whether a difference between the first set of weather data and the second set of weather data is above a nominal threshold of difference; and generate a corrective output in response to determining that the difference between the first set of weather data and the second set of weather data is above the nominal threshold of difference.

20. The device of claim 19, wherein the corrective output comprises at least a portion of the first set of weather data corresponding to the overlapping volume of airspace and the overlapping time interval.

* * * * *

UNITED STATES PATENT AND TRADEMARK OFFICE
CERTIFICATE OF CORRECTION

PATENT NO. : 10,151,834 B2
APPLICATION NO. : 15/220201
DATED : December 11, 2018
INVENTOR(S) : Guoqing Wang, Ji Li and Haifeng Wang Page 1 of 1

It is certified that error appears in the above-identified patent and that said Letters Patent is hereby corrected as shown below:

In the Claims

Column 25, Line 11 (Claim 17): Replace "determine, with…" with --determining, with…--

Column 25, Line 15 (Claim 17): Replace "generate, with…" with --generating, with…--

Signed and Sealed this
Twenty-fifth Day of August, 2020

Andrei Iancu
*Director of the United States Patent and Trademark Office*